United States Patent Office 3,143,269
Patented Aug. 4, 1964

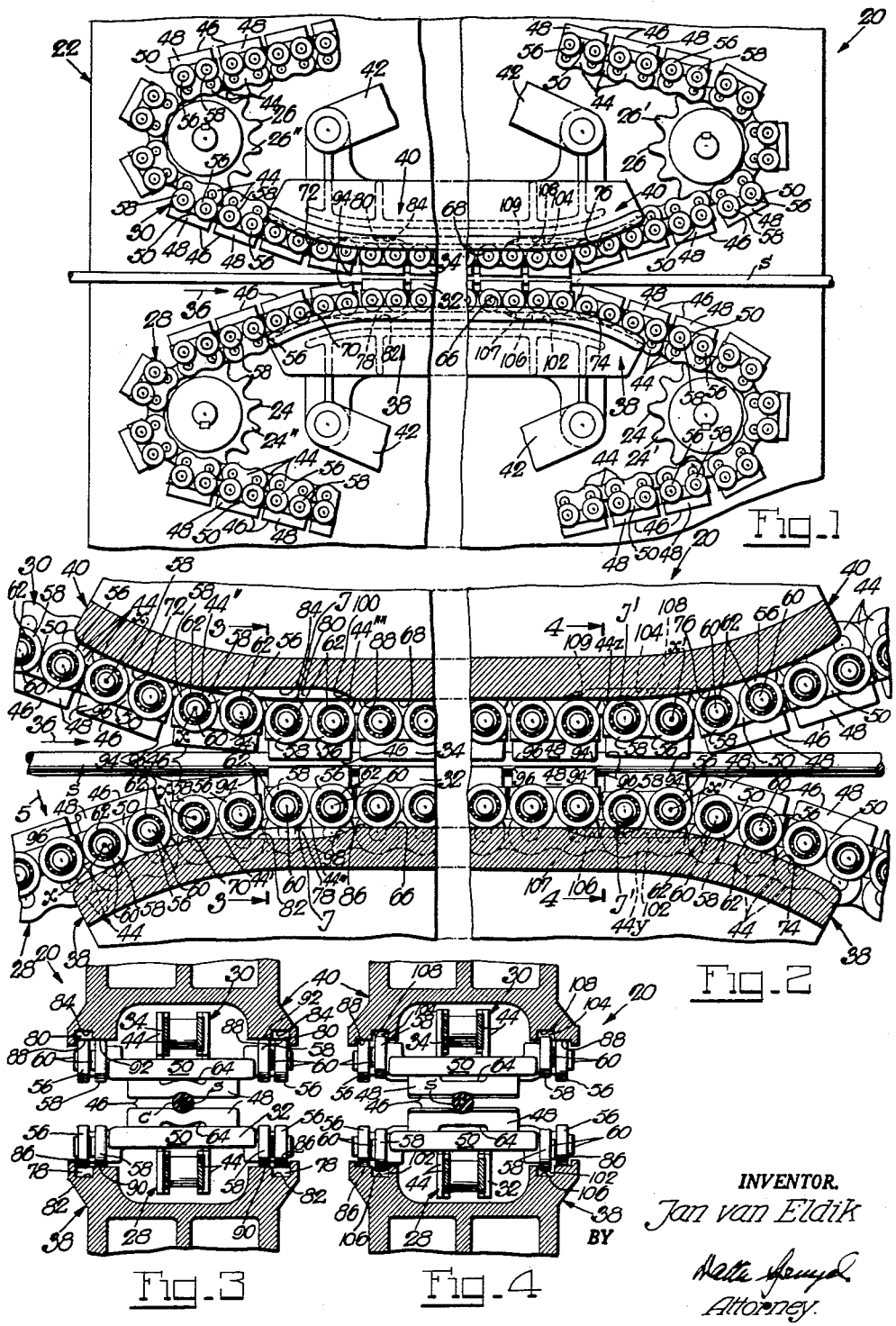

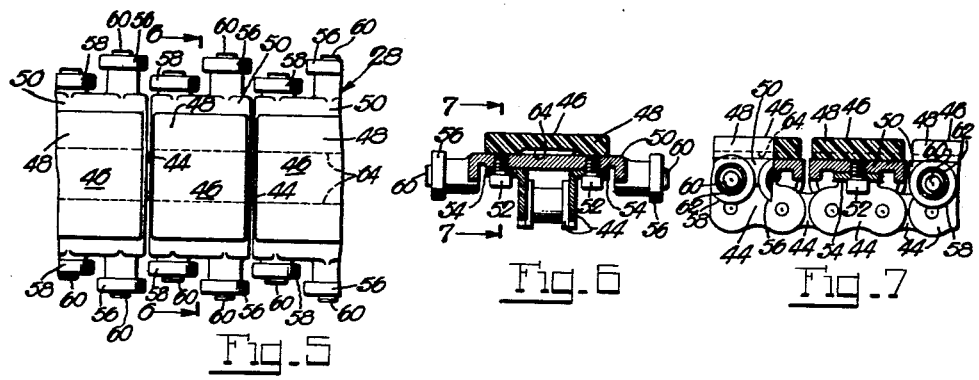
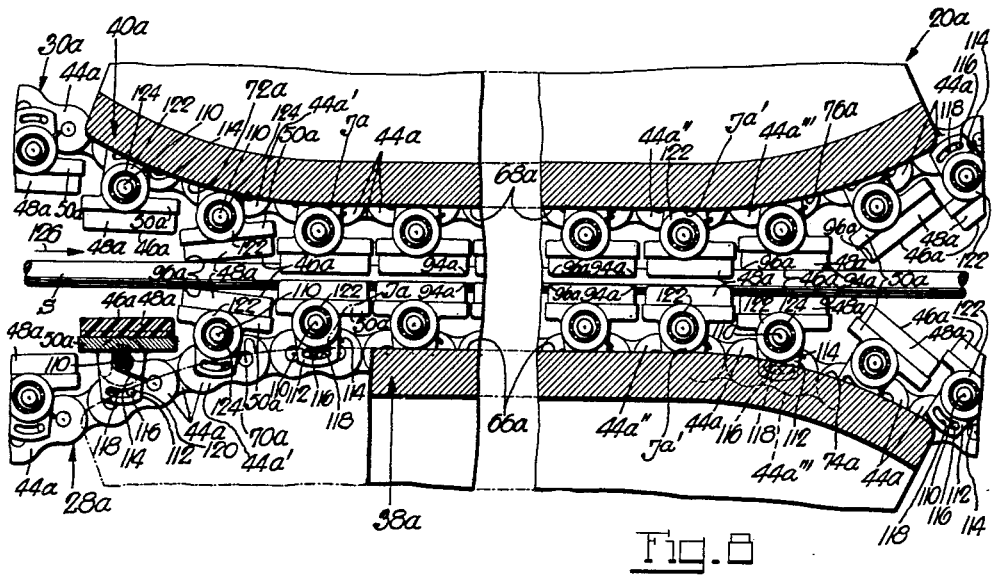

3,143,269
TRACTOR-TYPE STOCK FEED
Jan van Eldik, Bebington Wirral, Cheshire, England, assignor, by mesne assignments, to Crompton & Knowles Corporation, Worcester, Mass., a corporation of Massachusetts
Original application Nov. 29, 1961, Ser. No. 155,653, now Patent No. 3,103,306, dated Sept. 10, 1963. Divided and this application July 26, 1963, Ser. No. 305,908
5 Claims. (Cl. 226—172)

This application is a division of application of Serial No. 155,653, now Patent No. 3,103,306, filed November 29, 1961.

This invention relates generally to stock feeding devices, and more particularly to tractor-type feeds for rod-like stock.

Tractor-type feeds with which the present invention is concerned especially, though not exclusively, are used in continuously drawing wire or cable stock through a side delivery head of an extruder installation and through a subsequent vulcanizer installation for coating the stock with insulation and curing the insulation, respectively, before passing the stock to a take-up for its continuous wind on successive reels thereon. These feeds have companion tractors chains which over the extent of their confronting feed runs customarily roll with their links on back tracks in order to exert on the stock the powerful grip required for its reliable and continuous pull through the preceding installations at the usual high speeds, with the back tracks customarily having at the opposite ends of their usually straight-away feed sections lead-on and lead-off sections which guide the chain links substantially tangentially to and from the stock for their smooth return into and retraction from gripping engagement therewith. The stock-gripping surfaces of the individual links are customarily formed by separate feed pads thereon which are of any suitable relatively soft, yet highly wear-resistant, material to prevent marking of the stock, and these individual gripping surfaces are also of considerable extent lengthwise of the stock to keep the specific operating pressures between them advantageously at a minimum. Yet, despite the lead-on and lead-off sections of the tracks and the provision of the separate feed pads on the chain links, the stock shows all too frequently objectionable scuff marks from these pads especially when they start to grip the stock. This is due to the fact that on the run of the chain links over the lead-on sections of the tracks their pads jam with their leading ends against the stock and momentarily exert highly excessive pressures as well as rub, on the stock until their entire gripping surfaces shortly conform to the stock. The scuffing action of the pads on the stock, as well as wear of the pads over leading lengths thereof, are thus particularly severe. Similar, though not as severe, conditions prevail on the run-off of the chain links from the tracks. Thus, as the chain links run onto the lead-off sections of the tracks their pads jam with their trailing ends against the stock and momentarily exert undue pressures, as well as rub, on the stock until they shortly separate from the stock, whereby the stock is liable to be further scuffed and the feed pads further subjected to early and excessive wear over trailing lengths thereof.

It is an important object of the present invention to provide a tractor-type feed for rod-like stock, and especially for insulated wire or cable stock, which despite any magnitude of the pull on the stock required for its feed, and hence of the gripping forces exerted on the stock by the feed pads on the chain links, neither scuffs the stock nor subjects the pads for the longest time to any appreciable wear from the aforementioned or any other causes.

It is another object of the present invention to provide a tractor feed of this type in which the chain links are arranged so that on their run over the lead-on and lead-off sections of the back tracks the gripping surfaces of their feed pads will be in full gripping conformity with the stock on each first and final contact of the least gripping intensity therewith, thereby to obviate the aforementioned causes of stock scuffing and early and excessive wear of the feed pads.

It is a further object of the present invention to provide a tractor feed of this type in which the feed pads on the chain links are on their approach to and departure from the stock yieldingly tiltable sufficiently so that they will freely tilt with their gripping surfaces into full conformity with the stock before gripping the same with any appreciable force, and will also yieldingly bear against the stock in non-gripping fashion from the beginning to the end of their separation therefrom.

Another object of the present invention is to provide a tractor feed of this type in which the feed pads on the chain links are on their approach to and departure from the stock yieldingly tiltable, as aforementioned, by providing the chain links with leading and trailing pairs of rollers with which they wheel on the tracks and of which the rollers of the leading pairs are spaced differently than those of the trailing pairs so as to be out of each other's travel paths on the tracks, and the parts of the tracks in the paths of the leading and trailing roller pairs, respectively, are interrupted over continuing lengths of the track lead-on and feed sections and of the track feed and lead-off sections, respectively, so that the trailing and leading roller pairs serve advantageously as pivots for their chain links on the lead-on and lead-off track sections, respectively.

A further object of the present invention is to provide a tractor feed of this type in which the feed pads on the chain links are on their approach to and departure from the stock yieldingly tiltable, as before-mentioned, alternatively by pivoting the feed pads on the chain links for rocking motion thereon within a limited range and spring-urging them to those ends of their rocking ranges in which they will with their trailing ends first engage the stock on the run of their chain links over the lead-on track section, and providing the chain links pads with track roller means with which they wheel on the tracks. With this arrangement, the tracks need not be interrupted and, more importantly, the feed pads will wedge over their entire lengths against the stock with an overall force which not only self-adjusts to, but overpowers, any stock load, so that slippage of the stock in the running tractor feed is prevented regardless of the stock load.

Other objects and advantages will appear to those skilled in the art from the following, considered in conjunction with the accompanying drawings.

In the accompanying drawings, in which certain modes of carrying out the present invention are shown for illustrative purposes:

FIG. 1 is a fragmentary side view of a tractor feed embodying the present invention;

FIG. 2 is an enlarged fragmentary section through the same tractor feed;

FIGS. 3 and 4 are fragmentary cross-sections through the tractor feed taken substantially on the lines 3—3 and 4—4, respectively, of FIG. 2;

FIG. 5 is a fragmentary plan view of one of the tractor chains as seen in the diretcion of the arrow 5 in FIG. 2;

FIG. 6 is a section taken on the line 6—6 of FIG. 5;

FIG. 7 is a fragmentary view, partly in section and partly in side elevation, of one of the tractor chains, with the section being taken substantially on the line 7—7 of FIG. 6; and FIG. 8 is a fragmentary sectional view, partly broken away, of a tractor feed embodying the present invention in a modified manner.

Referring to the drawings, and more particularly to FIG. 1 thereof, the reference numeral 20 designates a tractor-type feed for stock s, such as insulated wire or cable, for example. The tractor feed 20 comprises a frame 22 in which are journalled two sets of rotary sprockets 24 and 26 that carry companion tractor chains 28 and 30, respectively. The chains 28 and 30 have adjacent runs 32 and 34 which grip the stock s and feed it in a predetermined path in the exemplary direction of the arrow 36, and the chain runs 32 and 34 are to this end led over back tracks 38 and 40, respectively, which by links 42 are suitably mounted on the frame 22 so that they may be movable to and from each other. For the drive of the chains 28 and 30, their respective rear sprockets 24' and 26' may be power-driven, while their respective front sprockets 24" and 26" may be idlers. The chains 28 and 30 are preferably also led over spring-urged idler sprockets (not shown) to take up their slack and keep them fairly taut for their smooth performance. There are also provided any suitable, usually fluid-pressure operated, devices (not shown) for urging the back tracks 38 and 40 toward each other with a force adequate to compel the chain runs 32 and 34 therebetween to grip the stock for its reliable forward feed thereby.

Chains 28 and 30 are preferably alike, wherefore a detailed description of one of them is sufficient. Thus, the chain 28 has concatenated links 44 (FIGS. 1 to 4, 6 and 7) of which in this instance alternate or "feed" links are provided with stock-gripping surfaces 46. More particularly, the gripping surfaces 46 are in this instance provided by feed pads 48 in the form of wear-resistant high-friction treads on support brackets 50 which at 52 are secured to lateral flanges 54 of the respective links 44 (FIGS. 6 and 7). Each feed link 44 carries roller means in the form of two pairs of rollers 56 and 58. More particularly, the rollers 56 and 58 are mounted on stubs 60 of the brackets 50 on the respective links, preferably through intermediation of antifriction bearings 62. The back surfaces of the feed pads 48 are longitudinally grooved at 64 so that their gripping surfaces 46 hug the stock in the fashion shown in FIG. 3 for its reliable forward feed. The back tracks 38 and 40 have "feed" sections 66 and 68 which are plane in this instance, and "lead-on" and "lead-off" sections 70, 72 and 74, 76 which converge to and diverge from the respective feed sections 66 and 68 and are continuous therewith. In operation of the tractor feed, the rear sprockets 24' and 26' are driven clockwise and anticlockwise, respectively (FIG. 1), for the feed of the stock in the exemplary direction of the arrow 36, with the links of the chains 28 and 30 riding with their rollers 56 and 58 on the respective tracks 38 and 40 successively over their lead-on, feed and lead-off sections 70, 66, 74 and 72, 68, 76, and feeding the stock while riding over the track feed sections 66 and 68, as will be readily understood.

In accordance with the present invention, provisions are made whereby the feed links 44 of both chains 28 and 30 will, on initial contact of their feed pads 48 with the stock s on each approach thereto, yield to the stock until they are with the entire length of their gripping surfaces 46 in conforming engagement with the stock, thereby to avoid momentary edgewise high-pressure contact of the feed pads with the stock with accompanying severe rubbing of the stock and ensuing scuffing of the same as well as early and excessive wear of the feed pads. To this end, the rollers of the travelwise leading and trailing pairs 56 and 58, respectively, of the links of both chains are differently spaced from each other so that the rollers of both pairs are out of each other's travel paths on the respective tracks 38 and 40. To the same end also, the tracks 38 and 40 are over certain containing lengths of their respective lead-on and feed sections 70, 66 and 72, 68 interrupted at 78 and 80 in the paths of the leading rollers 56 of the links of the respective chains 28 and 30. Thus, the leading rollers 56 of the links of both chains are, in the present example, spaced farther apart than the trailing rollers 58 thereof (FIGS. 3 to 5). The interruptions 78 and 80 in the tracks 38 and 40 are in this instance formed by groove formations 82 and 84 therein in the travel paths 86 and 88 of the leading rollers 56 of the respective chains 28 and 30 (FIGS. 1 to 4).

In operation of the tractor feed, the links 44 of the chains 28 and 30 will ride with their leading rollers 56 on the widely spaced travel paths 86 and 88, and with their trailing rollers 58 on the more narrowly spaced travel paths 90 and 92, on the respective tracks 38 and 40 (FIGS. 2 to 4). As successive links 44 of the chains ride on the lead-on sections 70 and 72 of the respective tracks 38 and 40 and approach the stock s, their leading rollers 56 will come into register with the track interruptions 78 and 80 in their respective paths preferably when the travelwise leading ends 94 of their feed pads 48 substantially reach the stock s. These links are thereupon free to yield to the stock at the leading ends 94 of their feed pads 48 until their leading rollers 56 pass beyond the respective track interruptions 78 and 80 and continue on their respective travel paths 86 and 88. Thus, considering the coordinated links 44' and 44" on the lead-on sections 70 and 72 of the respective tracks 38 and 40 (FIG. 2), it follows that these links have by the stock already been displaced with their leading rollers 56 to the maximum extent into the respective track interruptions 78 and 80 on the relatively short travel of their leading rollers 56 thereover, and they will by the stock be held displaced therein as their trailing rollers 58 more and more approach the junctions j of the lead-on and feed sections 70, 66 and 72, 68 of the respective tracks 38 and 40, with the displacing motion of these links being pivotal ones about the axes x of their trailing rollers 58 on the respective track lead-on sections 70 and 72. It further follows from FIG. 2 that the links 44' and 44", even in the absence of stock and with or without operating pull on the chains, be inclined to the adjacent tracks so that their trailing pad ends 96 are spaced farther from the respective tracks than their leading pad ends 94. This is due to the fact that their leading rollers 56 are in registry with and will in any event enter to some extent, the respective track interruptions 78, 80. Also, the groove formations 82 and 84, which form the interruptions 78 and 80 in the respective tracks 38 and 40, are sufficiently deep that the links may at their leading pad ends 94 yield to the stock until their trailing pad ends 96 reach the stock some time before their trailing rollers 58 reach the junctions j of the lead-on and feed sections of the respective tracks. It follows, therefore, that the tracks 38 and 40 in no wise interfere with the yieldability of the links 44 out of the stock path on their approach thereto and until they are with their entire pad surfaces 46 in engagement with the stock. Moreover, even exceptionally high operating pull on the chains 28 and 30 will not effectively oppose the ready yieldability of the feed links 44 out of the stock path, for it requires but little force, and hence relatively small pressure from the stock against the link pads 48, to depress these links at their leading ends out of line with the feed links next ahead, as will be readily understood. The links 44 will on their approach to the stock thus engage the same with their leading pad ends 94 and then yield quite readily to the stock until their trailing pad ends 96 reach the stock. Owing to the fact that the feed pads 48 are on their back faces centrally grooved at 64 (FIG. 3) and must grip the stock with the full force required for its forward feed when the trailing rollers 58 of their links reach the junctions j of the lead-on and feed sections of the respective tracks 38 and 40, the feed pads 48 will be in full engagement with the stock some time before the trailing rollers of their links reach the respective track junctions j. Thus, the links 44' and 44" will pass beyond their respective positions in FIG. 2 and come with their pad surfaces 46 into full engagement with the stock when they are with their trailing rollers 58 still some distance away from the respective track junctions *j*, and they will with their entire pad surfaces 46 be forced into increasing gripping engagement with and hug the stock in the fashion shown in FIG. 3 as their trailing rollers 58 come increasingly closer to and finally reach the respective track junctions *j*. Also, since the trailing rollers 58 of the feed links 44 extend with their axes *x* intermediate the ends 94 and 96 of their feed pads 48, the feed pads of the links passing from the lead-on to the feed sections of the respective tracks 38 and 40 will be in substantially uniform gripping engagement with the stock even before their trailing rollers 58 reach the respective track junctions *j*, wherefore their leading rollers 56 will already be withdrawn from the respective track interruptions 78 and 80 while still in register therewith. This is clearly demonstrated in FIG. 2 by the feed links 44''' and 44'''' directly ahead of the feed links 44' and 44''. Thus, the links 44''' and 44'''', being with their trailing rollers 58 quite near the respective track junctions *j*, are with their pad surfaces 46 in substantially uniform and full gripping engagement with the stock so that their leading rollers 56 are already withdrawn from the respective track interruptions 78 and 80, though they are still in register therewith. However, the groove formations 82 and 84 in the respective tracks 38 and 40, which define the track interruptions 78 and 80, have exit ends 98 and 100, respectively, which gradually lead to the respective track feed sections 66 and 68 and smoothly guide thereonto the leading rollers 56 of any links which are then not fully retracted from the respective track interruptions 78 and 80. The lengths of the groove formations 82 and 84 in the respective tracks 38 and 40 are preferably such that the links 44 are with their leading rollers 56 substantially at the junctions of the groove exit ends 98, 100 and respective track feed sections 66, 68 when their trailing rollers 58 are substantially at the junctions *j* of the respective track lead-on and feed sections 70, 66 and 72, 68.

The instant tractor feed 20 is highly advantageous in that stock being fed, and even wire or cable with an insulating and just vulcanized cover *c* (FIG. 3), will be neither scuffed nor otherwise marred by the reengaging chain links, and the feed pads on the links will be subject to negligible wear throughout and particularly at their leading ends. This is, of course, due to the ready yieldability of all feed links to the stock until their feed pads are in substantially uniform engagement with the stock being fed. Also, since the feed pads on the links fully engage the stock first and then grip the stock with rapidly, but nevertheless gradually, increasing force as their trailing rollers ride on the respective track lead-on sections to the junctions with the continuing track feed sections, the feed pads will assume the full stock load gradually and the tractor feed will, in consequence, perform with optimum smoothness and without the slightest stock jerks. The tractor feed will thus also draw stock at a rate of optimum uniformity, which is highly desirable and advantageous in many feed applications.

Within the purview of the present invention is a modified tractor feed in which only one track, for example the track 38, is provided with an interruption such as the track interruption 78 in FIG. 2. In such a modified tractor feed the chain links on the track 38 will yield to the stock as the same is slightly displaced from its normal feed path on edgewise engagement of the non-yielding chain links on the other track with the stock until they fully engage the same. However the described tractor feed 20 of FIGS. 1 to 4 is greatly preferred over this modified tractor feed, especially since the latter may nevertheless scuff stock and cause early and excessive wear of the feed pads if the stock is quite unwieldy.

To further avoid scuffing of the stock and also early and excessive wear of the feed pads as the chain links of the instant tractor feed 20 separate from the stock, the feed and lead-off sections 66, 74 and 68, 76 of the respective tracks 38 and 40 are over continuing lengths thereof also interrupted at 102 and 104 in the respective travel paths 90 and 92 of the trailing rollers 58 of the chain links (FIGS. 1, 2 and 4). The interruptions 102 and 104 in the respective tracks 38 and 40 are in this instance also formed by groove formations 106 and 108 the ends 107 and 109 of which may serve as smooth lead-off paths from the respective track feed sections 66 and 68. These groove formations 106 and 108 extend over such lengths of the respective tracks 38 and 40 that the trailing rollers 58 of the chain links come into registry therewith substantially when their leading rollers 56 reach the junctions *j'* of the feed and lead-off sections 66, 74 and 68, 76 of the respective tracks 38 and 40. With this arrangement, the feed pads 48 of the chain links 44 on the respective tracks 38 and 40 will be free to yield with their trailing ends 96 from the stock when their leading rollers 56 substantially reach the respective track junctions *j'*, with the yielding motions of these links being pivotal ones about the axes *x'* of their leading rollers 56 on the respective track lead-off sections 74 and 76 (FIG. 2). Thus, the exemplary opposing links 44*y* and 44*z* in FIG. 2, which are with their trailing rollers 58 already considerably within the regions of the respective track interruptions 102 and 104 and are with their leading rollers 56 considerably beyond the respective track junctions *j'*, have already been yielded by the stock with their trailing rollers 58 into the respective track interruptions 102 and 104 substantially to the same extent that their leading rollers 56 have moved away from the stock since passing the respective track junctions *j'*. These same links 44*y* and 44*z* will, on their continued travel, be by the stock further yielded with their trailing rollers into the respective track interruptions 102 and 104 until after their leading pad ends 94 have separated, and their trailing pad ends 96 will separate, from the stock, as will be readily understood. All feed links of the respective chains 28 and 30 will thus separate from the stock without scuffing the same or subjecting their feed pads to early and excessive wear especially at their trailing ends.

Reference is now had to FIG. 8 which shows a modified tractor feed 20*a* that differs from the described tractor feed 20 primarily by arranging the feed links 44*a* of the chains 28*a* and 30*a* so that their feed pads 48*a* initially engage the stock *s* with their trailing ends 96*a* and are there yieldable from the stock path until they are with their gripping surfaces 46*a* in complete engagement with the stock. To this end, the feed pads 48*a* are with their brackets 50*a* pivoted on the respective chain links 44*a* and spring-urged into a certain inclination thereto. Since all feed links 44*a* are preferably identical, a detailed description of only one of them, namely the link shown in section in FIG. 8, will be sufficient. Thus, this link carries a fixed pivot pin 110 on which the feed pad 48*a* is turnable with its bracket 50*a*, and more particularly with depending ears 112 thereon which preferably straddle the link. Surrounding the pin 110 and anchored with its ends to the latter and to the bracket 50*a* is a preloaded torsion spring 114 which normally urges this bracket with its feed pad in a clockwise direction. The bracket 50*a* has with the link a lost-motion connection in the form of a side pin 116 on the link and an arcuate slot 118 in one of the depending ears 112 of the bracket in which the pin 116 is received, with the bracket 50*a* being normally urged by the spring 114 to one end of its lost-motion connection with the link, namely the end thereof constituted by the end 120 of the slot 118. The link also has track roller means which in the present instance are in the form of a single pair of rollers 122 which through intermediation of antifriction bearings 124 are conveniently mounted directly on the link pin 110. The tracks 38*a* and 40*a* may be the same as the tracks 38 and 40 of FIGS. 1 to 4, except that the present tracks have no interruptions.

In operation of the tractor feed 20a for stock feed in the exemplary direction of the arrow 126 in FIG. 8, the links 44a of the chains 28a and 30a will travel over the respective track lead-on sections 70a and 72a, in the course of which their feed pads 48a will initially engage the stock with their trailing ends 96a and then be forced by the stock to pivot on their link pins 110 against the force of their springs 114 until their entire pad surfaces 46a come to bear against the stock when their rollers 122 are still some distance from the junctions ja of the lead-on and feed sections 70a, 66a and 72a, 68a of the respective tracks 38a and 40a. The exemplary back-grooved feed pads 48a will during the brief remaining travel of the rollers 122 of their links 44a on the respective track lead-on sections 70a and 72a be pressed into uniform and firm hugging engagement with the stock similarly as shown in FIG. 3, so that their surfaces 46a will advantageously grip the stock with rapidly, but nevertheless gradually, increasing forces and assume their shares of the stock load accordingly gradually. Thus, the links 44a' on the respective track lead-on sections 70a and 72a have just engaged the stock with the trailing ends 96a of their pivoted feed pads 48a, and the latter will on continued forward travel of their links be pivoted counterclockwise by the stock until they come into full engagement therewith, whereupon they will be pressed with increasing force into hugging engagement with the stock until their rollers reach the respective track junctions ja where the feed pads grip the stock with optimum force.

As the links 44a of the respective chains 28a and 30a leave with their rollers 122 the respective track feed sections 66a and 68a and travel on the continuing track lead-off sections 74a and 76a, their feed pads 48a will first ungrip from the stock before any parts thereof will separate therefrom. Thus, the links 44a", which presently pass with their rollers 122 over the junctions ja' of the feed and lead-off sections 66a, 74a and 68a, 76a of the respective tracks 38a and 40a, are with their feed pads 48a still in optimum gripping engagement with the stock. However, as the links 44a" proceed with their rollers further on the respective track lead-off sections 74a and 76a, their feed pads 48a will rapidly, but nevertheless gradually, ungrip from the stock by the time these links reach the position of the links 44a''', involving some anti-clockwise pivoting of their feed pads 48a on and relative to their respective links 44a" to or near the other ends of their lost-motion connections therewith, as will be readily understood. As the link 44a" travel with their rollers on the respective track lead-off section 74a and 76a beyond the positions shown, their feed pads 48a will under the urgency of their springs 114 pivot clockwise on their links, but only as permitted by the stock. Thus, the stock will permit these feed pads to pivot with their leading ends 94a gradually away from the stock while their trailing ends 96a are still in engagement with the stock, and the feed pads will be spring-returned to the normal ends of the lost-motion connections with their respective links only after their trailing ends 96a have cleared the stock.

It follows from the preceding description that the links 44a of the tractor chains yield with their feed pads 48a quite readily to the stock until they come into full engagement therewith on their approach thereto and until they are completely out of engagement therewith on their separation therefrom. The present tractor feed 20a thus has all the operational advantages of the hereinbefore described tractor feed 20.

The present tractor feed 20a has the further advantage that the pivoted feed pads 48a on the links 44a of the respective tractor chains 28a and 30a will grip the stock with a force which increases and decreases with increasing and decreasing stock load. Thus, since even on the run of the links 44a of both chains over the respective track feed sections 66a and 68a their feed pads 48a may pivot to any extent permitted by the stock which they grip, and since the chain pull is transmitted to these feed pads through their pivots, it stands to reason that the stock load on the feed pads of the respective chains 28a and 30a tends to swing them counterclockwise and clockwise, respectively (FIG. 8) about their pivot supports on the links, with ensuing actual jamming or wedging of the pad surfaces of opposing links against the stock therebetween always with a force which adjusts itself to and overcomes the stock load. Thus, the wedge action of the pad surfaces of the chain links on the stock will be light at a light stock load and will automatically increase with increasing stock load, with the reactive pressures of the rollers of the chain links on the respective track feed sections also decreasing and increasing with the stock load. The feed pads 48a may readily be made of adequate lengths, especially from their pivot supports on the respective links to their leading ends 94a over which they exert their optimum wedge forces on the stock, so as not to mar the stock or be subjected to prohibitive specific pressures when wedging against and pulling the stock. Thus, while the feed pads 48a could be pivoted anywhere intermediate their ends, they are in the present instance pivoted nearer to their trailing ends 96a than to their leading ends 94a in order to keep the specific operating pressures on these pads more nearly equal over their entire lengths.

The wedge action on stock of the pivoted feed pads on the chain links of the present tractor feed 20a is highly advantageous for many feed operations, and especially, though not exclusively, for pulling heavy stock loads. Also, while in the present tractor feed 20a the chain links 44a have advantageously single pairs of track rollers, the same may have double pairs of track rollers like the chain links 44 of FIGS. 1 to 4, and their feed pads 48a will nevertheless have a wedging action on the stock as long as they are pivoted on their respective roller-carrying links. Finally, it is also within the purview of the invention embodied in the tractor feed 20a to modify this tractor feed by using in lieu of one of the chains 28a and 30a with the featured pivoted feed pads on their links a conventional tractor chain with non-pivoted feed pads on its links. However, such a modified tractor feed is not preferred over the described feed 20a since the non-pivoted feed pads on the conventional chain might mar stock if the same is quite unwieldy.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a tractor-type stock feed, the combination of two sets of rotary sprockets; companion chains carried by said sprocket sets, respectively, and having adjacent runs to grip stock and feed it in a predetermined path; power means to drive certain sprockets for stock feed by said chain runs; and back tracks having feed sections for the respective chain runs and lead-on sections converging to and continuous with the respective feed sections, each chain having links with track roller means and stock-gripping surfaces with their opposite ends leading and trailing, respectively, in the chain drive direction, of which the surfaces of the links of at least one chain are provided by feed pads pivoted intermediate their ends on the respective links, and means urging said feed pads on their links into angular positions in which they reach the stock path with their trailing surface ends first and are yieldable from the stock path with their trailing surface ends.

2. The combination in a tractor-type stock feed as set forth in claim 1, in which said tracks have also lead-off sections continuous with and diverging from the respective feed sections, and said feed pads are on the run of their links over the lead-off section of the respective track yieldable with their trailing surface ends from the stock path at least until they clear said path.

3. In a tractor-type stock feed, the combination of two sets of rotary sprockets; companion chains carried by said sprocket sets, respectively, and having adjacent runs to grip stock and feed it in a predetermined path; power means to drive certain sprockets for stock feed by said chain runs; and back tracks having feed sections for the respective chain runs and lead-on sections converging to and continuous with the respective feed sections, each chain having links with track roller means and stock-gripping surfaces with their opposite ends leading and trailing, respectively, in the chain drive direction, of which the surfaces of the links of each chain are provided by feed pads pivoted intermediate their ends on the respective links, and means urging said feed pads on their links into angular positions in which they reach the stock path with their trailing surface ends first and are yieldable from the stock path with their trailing surface ends.

4. The combination in a tractor-type stock feed as set forth in claim 3, in which said tracks have also lead-off sections continuous with and diverging from the respective feed sections, and said feed pads are on the run of their links over the lead-off sections of the respective tracks yieldable with their trailing surface ends from the stock path at least until they clear said path.

5. The combination in a tractor-type stock feed as set forth in claim 3, in which the roller means of the links of each chain are single pairs of rollers extending with their rotary axes intermediate the surface ends of the feed pads on the respective links.

References Cited in the file of this patent

UNITED STATES PATENTS

| | | |
|---|---|---|
| 2,387,446 | Herz | Oct. 23, 1945 |
| 2,679,924 | Powell | June 1, 1954 |
| 2,981,452 | Baker et al. | Apr. 25, 1961 |

FOREIGN PATENTS

| | | |
|---|---|---|
| 845,642 | Great Britain | Aug. 24, 1960 |